US011418615B2

(12) United States Patent
Long, III et al.

(10) Patent No.: US 11,418,615 B2
(45) Date of Patent: *Aug. 16, 2022

(54) PROXY DEVICE THAT SELECTIVELY DISPATCHES RESOURCE REQUESTS

(71) Applicant: iHeartMedia Management Services, Inc., San Antonio, TX (US)

(72) Inventors: James M. Long, III, Winter Springs, FL (US); Travis D. Terry, Satellite Beach, FL (US); Thomas Dacre Drapeau, Harrison, NY (US)

(73) Assignee: iHeartMedia Management Services, Inc., San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/407,960

(22) Filed: Aug. 20, 2021

(65) Prior Publication Data

US 2021/0385291 A1    Dec. 9, 2021

Related U.S. Application Data

(63) Continuation of application No. 17/101,356, filed on Nov. 23, 2020, now Pat. No. 11,102,321, which is a continuation of application No. 16/654,361, filed on Oct. 16, 2019, now Pat. No. 10,855,790, which is a continuation of application No. 16/186,213, filed on Nov. 9, 2018, now Pat. No. 10,484,496, which is a
(Continued)

(51) Int. Cl.
| | |
|---|---|
| *H04L 67/562* | (2022.01) |
| *H04L 67/60* | (2022.01) |
| *H04L 47/70* | (2022.01) |
| *H04L 67/02* | (2022.01) |
| *H04L 9/40* | (2022.01) |
| *H04L 47/78* | (2022.01) |

(52) U.S. Cl.
CPC ........ *H04L 67/2809* (2013.01); *H04L 47/821* (2013.01); *H04L 63/0281* (2013.01); *H04L 63/10* (2013.01); *H04L 63/102* (2013.01); *H04L 67/02* (2013.01); *H04L 67/32* (2013.01); *H04L 47/781* (2013.01)

(58) Field of Classification Search
CPC . H04L 67/2809; H04L 47/781; H04L 47/821; H04L 63/0281; H04L 63/10; H04L 63/102; H04L 67/02; H04L 67/32
See application file for complete search history.

(56) References Cited

U.S. PATENT DOCUMENTS

| | | |
|---|---|---|
| 6,192,362 B1 | 2/2001 | Schneck et al. |
| 6,195,666 B1 | 2/2001 | Schneck et al. |
| (Continued) | | |

*Primary Examiner* — Sargon N Nano
(74) *Attorney, Agent, or Firm* — Garlick & Markison; Edward J. Marshall

(57) ABSTRACT

A proxy device receives a resource request from a requestor via a client device. The resource request is associated with a hosted resource, and the hosted resource is associated with a version-control tag. The proxy device determines, based on the version-control tag, information indicating a current state of the hosted resource. The proxy device obtains user management information associated with the requestor, and conditionally dispatches a processed resource request from the proxy device to a resource host based, at least in part, on the current state of the hosted resource and the user management information.

20 Claims, 8 Drawing Sheets

Related U.S. Application Data continuation of application No. 15/657,566, filed on Jul. 24, 2017, now Pat. No. 10,129,354, which is a continuation of application No. 14/755,377, filed on Jun. 30, 2015, now Pat. No. 9,736,259.

(56) References Cited

U.S. PATENT DOCUMENTS

| | | |
|---|---|---|
| 6,208,986 B1 | 3/2001 | Schneck et al. |
| 6,260,039 B1 | 7/2001 | Schneck et al. |
| 6,523,065 B1 | 2/2003 | Combs |
| 6,574,655 B1 | 6/2003 | Libert et al. |
| 6,826,692 B1 | 11/2004 | White |
| 7,620,630 B2 | 11/2009 | Lloyd et al. |
| 7,668,939 B2 | 2/2010 | Encarnacion et al. |
| 7,849,502 B1 | 12/2010 | Bloch et al. |
| 8,528,059 B1 | 9/2013 | Labana et al. |
| 8,924,996 B2 | 12/2014 | Shafiee |
| 9,077,688 B2 | 7/2015 | Amit et al. |
| 9,154,488 B2 * | 10/2015 | Innes ............... H04L 63/0281 |
| 9,219,733 B2 | 12/2015 | Brewer et al. |
| 9,298,715 B2 * | 3/2016 | Kumarasamy ........ G06F 16/134 |
| 9,313,207 B2 | 4/2016 | Cicchitto |
| 9,380,028 B2 | 6/2016 | Rizzo et al. |
| 9,509,692 B2 * | 11/2016 | Innes ............... H04L 63/0823 |
| 9,900,365 B2 | 2/2018 | Herse et al. |
| 9,928,379 B1 | 3/2018 | Hoffer |
| 2001/0037292 A1 | 11/2001 | Vogt |
| 2002/0099829 A1 | 7/2002 | Richards et al. |
| 2002/0194099 A1 | 12/2002 | Weiss |
| 2003/0115322 A1 | 6/2003 | Moriconi et al. |
| 2003/0115484 A1 | 6/2003 | Moriconi et al. |
| 2004/0152469 A1 | 8/2004 | Yla-Outinen et al. |
| 2005/0138137 A1 | 6/2005 | Encarnacion et al. |
| 2005/0138179 A1 | 6/2005 | Encarnacion et al. |
| 2005/0138192 A1 | 6/2005 | Encarnacion et al. |
| 2005/0138193 A1 | 6/2005 | Encarnacion et al. |
| 2005/0225128 A1 | 10/2005 | Diemer et al. |
| 2005/0257247 A1 | 11/2005 | Moriconi et al. |
| 2006/0123113 A1 | 6/2006 | Friedman |
| 2006/0253892 A1 | 11/2006 | Grayson |
| 2007/0250590 A1 | 10/2007 | Flannery et al. |
| 2007/0282899 A1 | 12/2007 | Goodman et al. |
| 2009/0106550 A1 | 4/2009 | Mohamed |
| 2009/0150981 A1 | 6/2009 | Amies et al. |
| 2009/0327502 A1 | 12/2009 | Brewer et al. |
| 2011/0137991 A1 | 6/2011 | Russell |
| 2012/0304233 A1 | 11/2012 | Roberts et al. |
| 2013/0080520 A1 | 3/2013 | Kiukkonen et al. |
| 2013/0174277 A1 | 7/2013 | Kiukkonen et al. |
| 2014/0052864 A1 * | 2/2014 | Van Der Linden ..... H04L 47/70 709/226 |
| 2014/0331297 A1 * | 11/2014 | Innes ................. H04L 63/0823 726/7 |
| 2014/0359748 A1 | 12/2014 | Rizzo et al. |
| 2015/0058968 A1 | 2/2015 | Wang et al. |
| 2015/0134962 A1 | 5/2015 | Mahajan et al. |
| 2015/0134972 A1 | 5/2015 | Martin et al. |
| 2015/0310188 A1 | 10/2015 | Ford et al. |
| 2015/0317626 A1 | 11/2015 | Ran et al. |
| 2015/0365399 A1 | 12/2015 | Biswas et al. |
| 2015/0365412 A1 * | 12/2015 | Innes ..................... H04L 63/08 726/7 |
| 2016/0080484 A1 * | 3/2016 | Earl .................... H04L 67/1008 709/226 |
| 2016/0110555 A1 | 4/2016 | Kuo et al. |
| 2016/0154707 A1 * | 6/2016 | Kumarasamy ........ G06F 16/134 707/649 |
| 2017/0006126 A1 | 1/2017 | Long et al. |
| 2017/0127115 A1 | 5/2017 | Lee et al. |
| 2017/0149565 A9 | 5/2017 | Pauker et al. |
| 2018/0026733 A1 | 1/2018 | Yang et al. |
| 2018/0097742 A1 * | 4/2018 | Foskett .................... H04L 47/82 |
| 2019/0158596 A1 | 5/2019 | McShane et al. |
| 2020/0382330 A1 | 12/2020 | Gucea |

\* cited by examiner

PROXY DEVICE THAT SELECTIVELY DISPATCHES RESOURCE REQUESTS

CROSS REFERENCE TO RELATED PATENTS

The present U.S. Utility patent application claims priority pursuant to 35 U.S.C. § 120 as a continuation of U.S. Utility application Ser. No. 17/101,356 entitled "SELECTIVELY TRANSFORMING ASSETS RETURNED BY A PROXY DEVICE," filed Nov. 23, 2020, scheduled to issue as U.S. Pat. No. 11,102,321 on Aug. 24, 2021, which is a continuation of U.S. Utility application Ser. No. 16/654,361 entitled "SERVICING ASSET REQUESTS VIA PROXY," filed Oct. 16, 2019, now U.S. Pat. No. 10,855,790 issued on Dec. 1, 2020, which is a continuation of U.S. Utility application Ser. No. 16/186,213 entitled "PROXY-CONTROLLED REQUEST ROUTING," filed Nov. 9, 2018, now U.S. Pat. No. 10,484,496 issued on Nov. 19, 2019, which is a continuation of U.S. Utility application Ser. No. 15/657,566 entitled "PROXY-CONTROLLED REQUEST ROUTING," filed Jul. 24, 2017, now U.S. Pat. No. 10,129,354 issued on Nov. 13, 2018, which is a continuation of U.S. Utility application Ser. No. 14/755,377 entitled "PLATFORM-AS-A-SERVICE WITH PROXY-CONTROLLED REQUEST ROUTING," filed Jun. 30, 2015, now U.S. Pat. No. 9,736,259 issued on Aug. 15, 2017, all of which are hereby incorporated herein by reference in their entirety and made part of the present U.S. Utility patent application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

1. Technical Field of the Invention

This invention relates generally to using a proxy device to dispatch resource requests, and more particularly to a proxy device that selectively dispatches resource requests.

2. Description of Related Art

Many modern companies, organizations, or other entities are geographically decentralized, having subsidiaries, affiliates, operating units, offices, or other entities located in widely separated geographic areas. In some cases, each individual entity maintains, and controls access its own resources, for example data, web development tools, and media files, making sharing and controlling access to those resources by other entities complicated. In practice, this often results in minimal sharing of resources due to access security constraints.

In other instances, a parent company can attempt to centrally control all shared resources. This can work well for organizations that impose a rigid hierarchical structure, but can require huge costs and efforts to establish and maintain centralized control over the shared resources. In practice, many resources may not be made available via the centrally controlled sharing mechanism due to cost and maintenance requirements, again resulting in minimal sharing of resources. Furthermore, different users associated with the individual entities may have individual needs that lead to an unwieldy proliferation of resource management tools.

BRIEF SUMMARY OF THE INVENTION

The present invention is directed to apparatus and methods of operation that are further described in the following Brief Description of the Drawings, the Detailed Description of the Invention, and the claims. Various features and advantages of the present invention will become apparent from the following detailed description of the invention made with reference to the accompanying drawings.

BRIEF DESCRIPTION OF THE SEVERAL VIEWS OF THE DRAWING(S)

Figure 6:
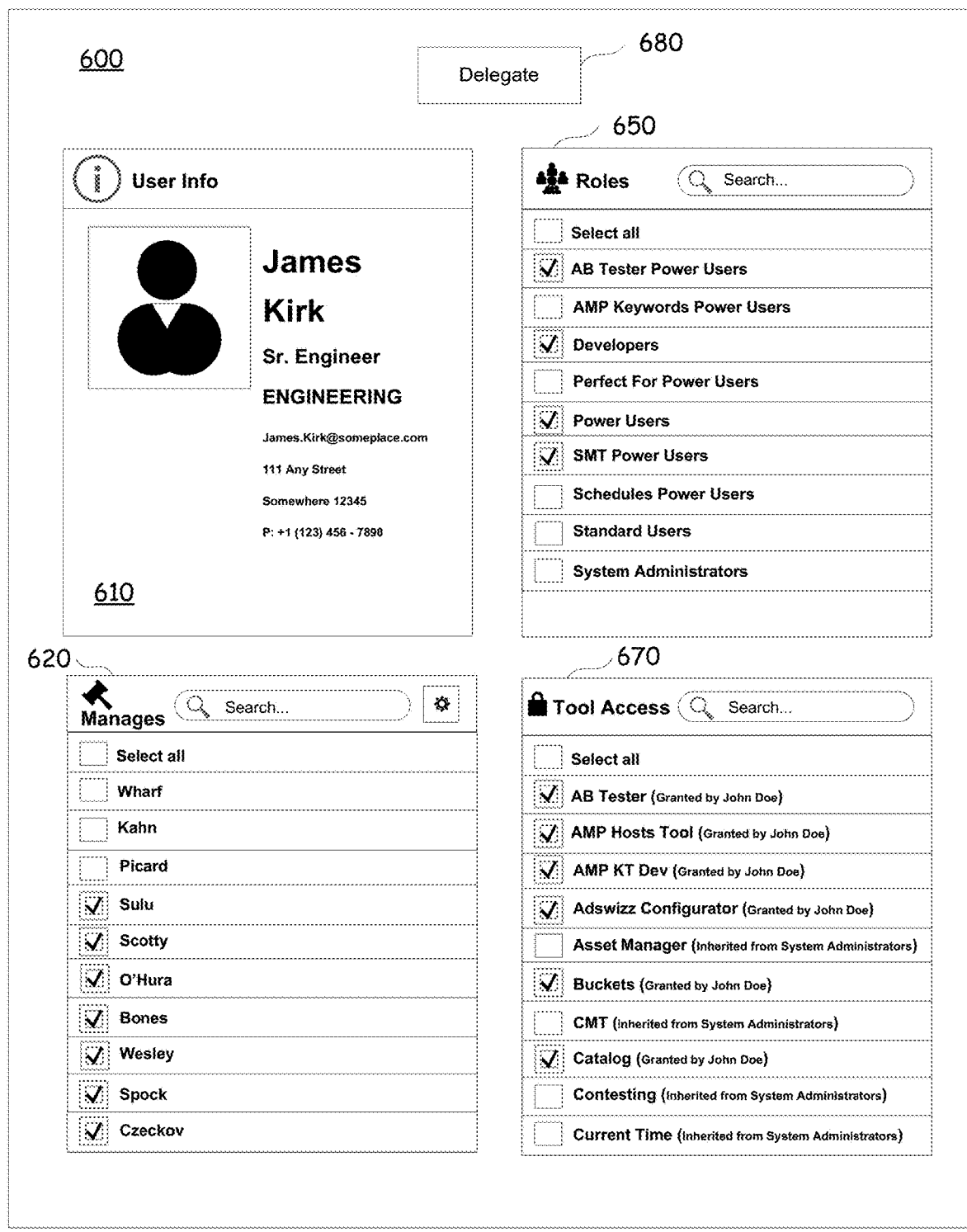
FIG. 6 is a representation of a graphical user interface presenting management information associated with a second user, who is a subordinate of the first user of FIG. 5, in accordance with various embodiments of the present disclosure.
Figure 7:
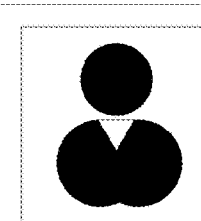
Figure 8:
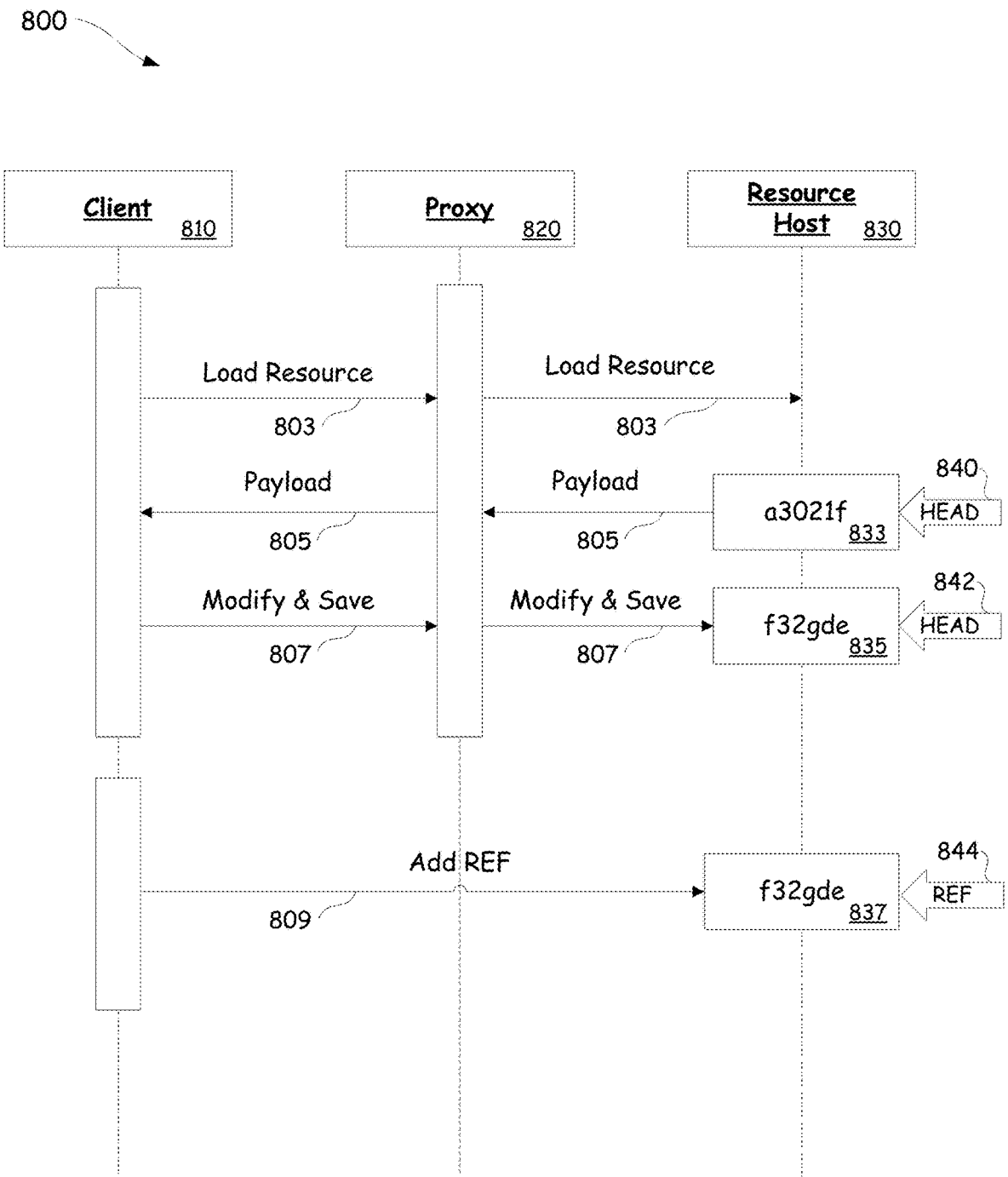

FIG. 7 is a representation of a graphical user interface presenting management information associated with a third user, who is a subordinate of the second user of FIG. 6, in accordance with various embodiments of the present disclosure; and FIG. 8 is a flow diagram illustrating information flow between a client, a proxy, and a resource host in accordance with various embodiments of the present disclosure.

DETAILED DESCRIPTION OF THE INVENTION

In various embodiments, a user can request access to a resource, sometimes referred to herein as an asset, hosted at a server device. The resource or asset can be an audio, video, text, or multimedia file, a program file such as a Hypertext Markup Language (HTML) or JavaScript Object Notation (JSON) file, any of various downloadable or hosted tools, for example a source code tool, a compiler or other programming tool, an editing tool, a website development tool, a media broadcasting tool, or the like.

The resource request can be received by a proxy, which determines whether or not to forward the request to the server hosting the resource. The determination made by the proxy can include performing a multi-stage authentication and authorization process that uses directory information obtained from one source, and management information obtained from another source. The directory information can be used by the proxy to determine whether the requestor is an authorized network user. If the requestor is an authorized network user, the proxy can use the management information to determine whether or not the requestor is authorized to access the requested resource. Assuming that both portions of the test are satisfied, the proxy can forward the request to the resource host for servicing.

In some embodiments, once the request has been forwarded to the resource host, the proxy can be removed from the process, and the requestor and the host can communicate directly with each other without requiring proxy intervention. In other embodiments, however, the resource host provides the requested resource to the requestor via the proxy. In some such implementations, the proxy can transform the resource from a format or configuration used by the resource host into a different format or configuration used by the device that sent the request. For example, the proxy can generate a transformed resource file by transforming a base resource file received from a resource host. The base resource file can be transformed by using pipeline language parameters included in a URL associated with the access request to create a set of functions to be applied in series. In some embodiments the URL to which the request is sent can include embedded pipeline language parameters or instructions. These pipeline language parameters can include information indicating a necessary format, or a format in which the requesting device would prefer to receive the resource.

Requesting access to a resource can include requesting write access, so that the resources stored in one or more resource hosts can be modified or added by individual users, and shared by other users. The resources can be stored using a versioning system in some embodiments. Furthermore, the management information that indicates a user's authorization to access particular resources can be shared with other user's in a "what you have you can grant" paradigm, without requiring the user granting access to have elevated access authority. For example, even if a user does not have administrator-level access, that user can grant to users designated as his subordinates some or all of the access assigned to the user. This can facilitate non-centralized granting and restricting access authority.

Figure 1:
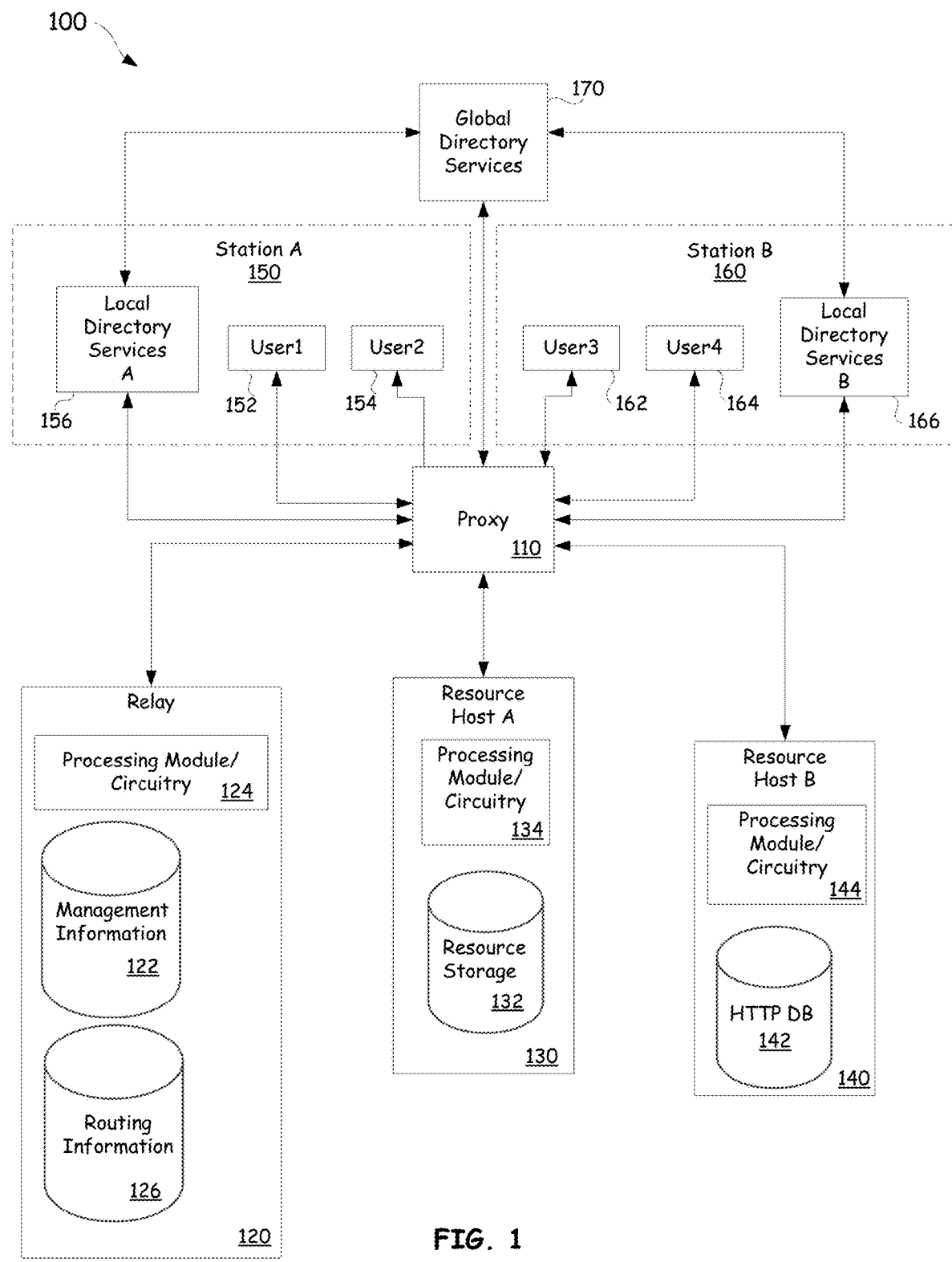
FIG. 1 is a block diagram of an embodiment of a system, in accordance with various embodiments of the present disclosure.

Referring to FIG. 1, a system 100 will be discussed according to various embodiments of the present disclosure. System 100 includes proxy 110, Relay 120, Resource Host A 130, Resource Host B 140, Station A 150, Station B 160, and Global Directory Services 170. Relay 120 can include Processing Module 124, Management Information Data Store 122, and Routing Information Database 126. Resource Host A 130 can include processing module 134 and resource storage 132. Resource Host B 140 can include Processing Module 144 and HTTP Database (DB) 142. Station A 150 can include Local Directory Services A 156, User1 152, and User2 154. Station B 160 can include Local Directory Services B 166, User3 162, and User4 164.

Station A 150 and Station B 160 can be affiliated entities of a larger organization, entity, corporation, company, etc. For example, Station A 150 and Station B 160 can be local broadcast or Internet radio stations affiliated with a regional, national or international radio broadcasting company or another media entity. In some embodiments, Station A 150 and Station B 160 can be affiliated with each other in a broad, or general sense, even if not considered to be "affiliates" in the strictest sense. For example, Station A 150 and Station B 160 may be loosely connected by a formal or informal agreement or contract. In some embodiments, Station A 150 and Station B 160 can be considered to be affiliated if they share access to common resources hosted by Resource Host A 130 or Resource Host B 140, or if they share common directory services, such as Global Directory Services 170.

In at least one embodiment, Station A 150 and Station B 160 each uses its own local directory services, Local Directory Services A 156 and Local Directory Services B 166, to control access to internal network resources. For example, Station A 150 can use Local Directory Services A 156, which can include a Lightweight Directory Access Protocol (LDAP), for example a Microsoft® Active Directory®, to control the access of User1 152 and User2 154 to various network resources. Similarly, Station B 160 can use Local Directory Services B 156 can use a Lightweight Directory Access Protocol (LDAP), for example, Apache Directory®, to control the access of User3 162 and User4 164 to various network resources. As used herein, the term "directory services" refers to a set of one or more processes or services used to authenticate and authorize users in a network or subnetwork by assigning and enforcing security policies. For example, when a user attempts to log onto a computer domain, a directory service can be used to verify that the user is an authorized network user by verifying a password entered by the user. The directory service can also be used to determine a user type, for example "administrator" or "user."

In some embodiments, Global Directory Services 170 is controlled by Station A 150, by Station B 160, by proxy 110, or by another entity (not illustrated), for example a parent organization, of which Station A 150 and Station B 160 are affiliates. Global Directory Services 170 can, in some embodiments, obtain and store directory information from either or both of Local Directory Services A 156 and Local Directory Services B 166. In some implementations, Global Directory Services 170 also includes additional directory information not included in either Local Directory Services A 156 or Local Directory Services B 166. For example, Global Directory Services 170 can include directory information associated with other affiliates or related entities, in addition to directory information associated with parent entity users.

In various embodiments, the information in Global Directory Services 170 is unique to itself, and does not replicate information included from Local Directory Services A 156 and Local Directory Services B 166. Other embodiments can use directory information in Global Directory Services 170 to populate the directory information in Local Directory Services A 156 and Local Directory Services B 166. In some such embodiments, some or all of the directory information in Global Directory Services 170 can be transmitted to Local Directory Services A 156 for replication and storage, and some or all of the directory information in Global Directory Services 170 is transmitted to Local Directory Services B 166 for replication and storage.

In some embodiments, Proxy 110 can obtain directory information from any or all of Global Directory Services 170, Local Directory Services A 156, and Local Directory Services B 166 for use in determining whether a user requesting access to a shared resource is an authorized network user. In some embodiments, only authorized network users are permitted to submit requests for access to resources, and if directory information does not indicate that a requestor is an authorized network user, any request submitted can be ignored, rejected, generate an error message delivered to the unauthorized requestor, or initiate an access-violation response. For example, a URL associated with a request by an unauthorized user can be reported to Global Directory Services 170, Local Directory Services A 156, Local Directory Services B 166, or to another network monitoring device. In some embodiments, in response to receiving one or more unauthorized access notifications from Proxy 110, any of the directory services can freeze the account of the requestor for a predetermined period of time, or initiate an elevated authentication protocol.

Proxy 110 can, in some embodiments, maintain its own directory services database (not separately illustrated), and synchronize the proxy's directory services database with one or more other directory services databases, and use the information in the synchronized proxy directory services database for decision making purposes. For example, Proxy 110 can maintain Global Directory Services 170 by periodically obtaining updated directory information from Local Directory Services A 156 and Local Directory Services B 166, and storing the combined directory information in a database used by Global Directory Services 170. Rather than maintaining its own directory services database, Proxy 110 can, in some embodiments, query Global Directory Services 170, Local Directory Services A 156, or Local Directory Services B 166 each time a resource request is received at Proxy 110.

Proxy 110 can also obtain management information from Relay 120. The management information can be used by Proxy 110 to grant or deny the resource request. In at least one embodiment, the user management information includes role information indicating roles assigned to one or more users, subordinate user information indicating subordinate users, and by extension supervisors to which the subordinate users are assigned, access authorization information indicating resources to which particular users have access, and source-of-rights information indicating whether a user's access authorizations were granted by another user, and if so which user granted that access authorization. In some embodiments that use multiple, non-duplicated directory services for different users or entities, management information can also include information indicating which directory service the proxy should contact for information about whether a requestor is an authorized network user.

The management information obtained from Relay 120 can also be used to determine whether a user attempting to grant access to, or remove access from, another user is allowed to do so. As mentioned above, some embodiments operate on a "what you have you can grant" paradigm, referring to the ability of a first user to grant a second user access to resources the first user is authorized to access. In some such embodiments, the ability to grant access can be limited to supervisor-subordinate relationships. For example, a supervisor can be allowed to grant his subordinates authorization to access to any or all of the resources the supervisor herself is authorized to access. In some such embodiments, Proxy 110 can use the role information and the subordinate user information to determine whether a particular user is allowed to grant another user access to a particular resource, or to assign another user to a particular role, or conversely whether the user is allowed to restrict another user.

In addition to obtaining management information from Relay 120, and directory information from Global Directory Services 170, Local Directory Services A 156, or Local Directory Services B 166, Proxy 110 can also obtain routing information from Routing Information Database 126. Routing information can include a network address from which a particular resource is available, such as the network address of Resource Host A 130 or Resource Host B 140. For example, if a message received at Proxy 110 requests access to a particular version of a particular media file, Proxy 110 can use the routing information to determine that the requested resource, or asset, is maintained in HTTP Database 142, hosted by Resource Host B 140. If Proxy 110 determines that the requested access is authorized, Proxy 110 can route the request to Resource Host B 140. In some embodiments, Proxy 110 can temporarily store the request and forward the request to an appropriate address determined based on the routing information. In other embodiments, Proxy 110 can repackage, revise, or encapsulate and re-transmit the request so that the destination host, in this example Resource Host B 140, delivers its response to Proxy 110.

Figure 2:
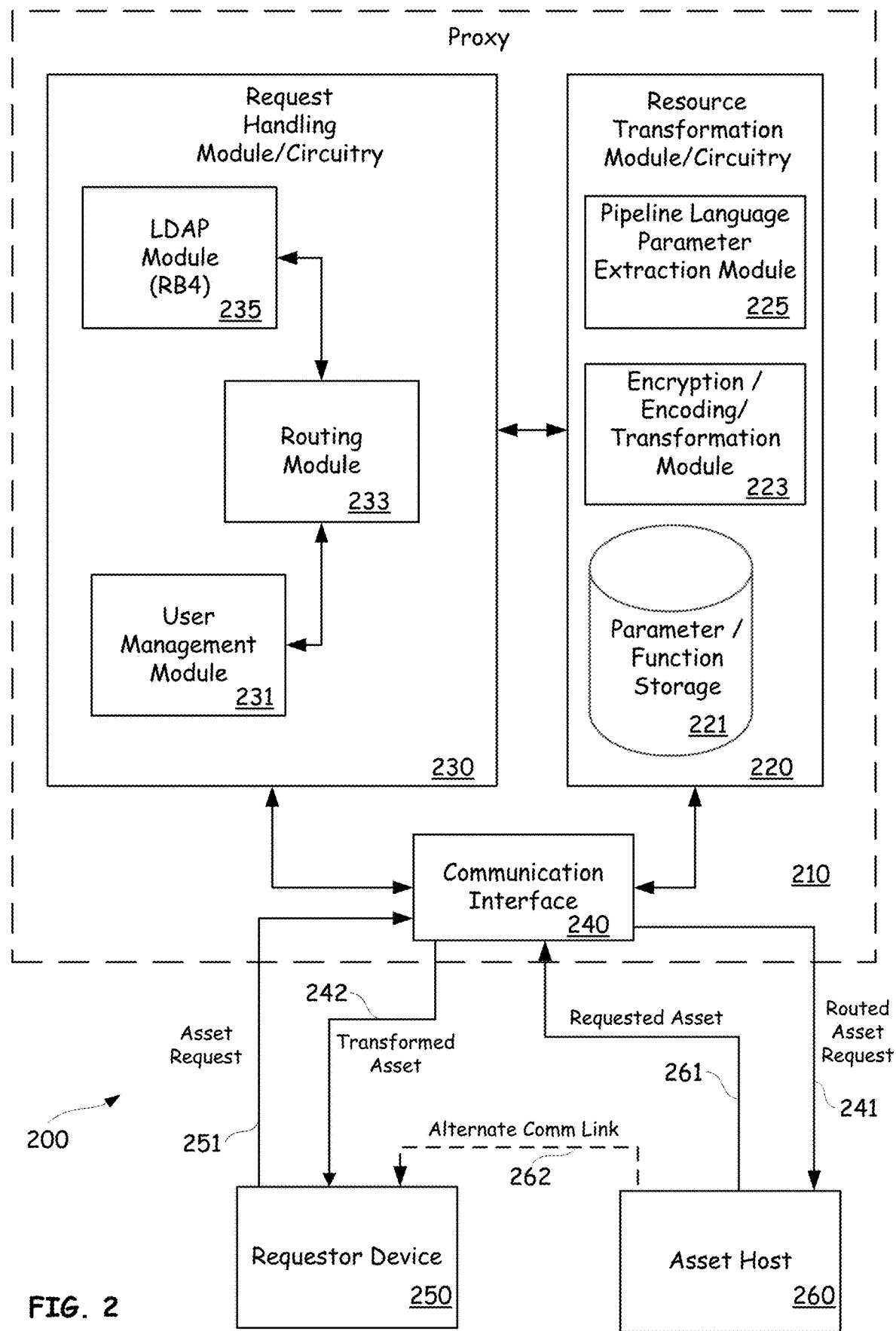
FIG. 2 is a block diagram illustrating a system including a proxy in communication with a requestor device and an asset host, in accordance with various embodiments of the present disclosure.

Referring next to FIG. 2, a system 200 including a Proxy 210 in communication with Requestor Device 250 and Asset Host 260 will be discussed in accordance with various embodiments of the present disclosure. Proxy 210 includes Communications Interface 240, which can be a wired or wireless interface configured to allow Proxy 210 to communicate via communications network such as the Internet; Request Handling Module 230, which in turn includes LDAP Module 235, Routing Module 233, and User Management Module 231; and Resource Transformation Module 220, which includes Extraction Module 225, Transformation Module 223, and Parameter/Function Storage 221.

Requestor Device 250 can be a computer terminal, smart phone, laptop, tablet, or other device used by a requestor to send an Asset Request 251 to Proxy 210, where the asset request can include a request access to an asset available from Asset Host 260, which can be a collection of one or more server device that stores assets, or resources, in a database or other storage construct within physical memory. The asset request can include a uniform resource locator (URL), or other network address associated with the requested asset. The URL can be part of the request, but does not necessarily designate the current network address at which the requested asset is located. In at least some embodiments, the URL can be used to designate a particular asset, and a particular version of the asset. In some embodiments, the URL can also include pipeline language parameters that specify a format, encoding, and/or encryption type in which Requestor Device 250 expects to receive the asset. Asset Request 251 also includes, in some embodiments, information identifying a requestor associated with Asset Request 251, which can include information about the requestor's network credentials.

Asset Request 251 is received at Communications Interface 240, and can be routed to Request Handling Module 230 and Resource Transformation Module 220. LDAP Module 235 can obtain directory information from a directory services database to determine if Asset Request 251 is from an authorized network user. LDAP Module 235 can obtain the directory information and compare the information about the requestor's credentials with the directory information to make a determination regarding whether the requestor is an authorized network user. Alternatively, LDAP Module 235 can query a directory services server and determine whether the user is an authorized network user based on a response from directory services server. In some embodiments, a requestor is determined to be an authorized network user if the requestor is a member of a particular computer domain, workgroup, or other security group known to the directory services server, or if the directory information otherwise indicates that the requestor is authorized to communicate with Proxy 210 via a network to which Communications Interface 240 is connected.

If the requestor is determined to be an authorized network user, User Management Module 231 can be used to check user management information associated with the requestor to verify that the requestor is authorized to access the requested asset, or resource. For example, the management information may indicate a requestor is assigned to a role that is authorized to download a current version of an HTML document, but not to a role authorized to store changes to that same HTML document. In this example, if Asset Request 251 simply requests downloading the HTML document, the request will be forwarded to Asset Host 260, but if Asset Request 251 is a write request, Asset Request 251 will be denied. In some cases, a denied asset request can be simply discarded. However, in other embodiments an error notification, or a "Request Denied" response can be delivered from Proxy 210 to Requestor Device 250. In yet other embodiments, denied requests are tracked, and when a threshold number of requests are denied, heightened authentication or other security measures can be implemented.

For purposes of this example, assume that Asset Request 251 passes the multi-level authentication and authorization process implemented LDAP Module 235 and User Management Module 231. In that case, Routing Module 233 can be used to obtain information about the current location and status of the requested asset, and Routed Asset Request 241 can be transmitted to Asset Host 260, via Communications Interface 240. In response to receiving Routed Asset Request 241, Asset Host 260 processes the request, and in some embodiments delivers Requested Asset 261 to Proxy 210. In other embodiments, Asset Host 260 can transmit the requested asset directly to Requestor Device 250 via an Alternate Communications Link 262, bypassing Proxy 210.

For embodiments in which Asset Host 260 delivers Requested Asset 261 to Proxy 210, Requested Asset 261 can be transformed using Resource Transformation Module 220. Resource Transformation Module 220 can use Extraction Module 225 to extract pipeline language parameters from the URL included in the original request. For example, if the request URL includes the following: "http://subdomain.hostdomain.com/fit(100,100)/fit(75,75)/bar(5,5)/ . . . ", Extraction Module 225 can read the URL, extract the pipeline parameters "fit(100,100)," "fit(75,75)," and "bar(5,5)," and store the extracted pipeline parameters in Parameter/Function Storage 221. Upon receiving Requested Asset 261 from Asset Host 260, Transformation Module 223 can retrieve the stored pipeline parameters and apply the transform commands to Requested Asset 261, in the same order indicated in the URL, to generate Transformed Asset 242. In this example, Transformation Module 223 will fit the image into a 100-pixel square; then a 75-pixel square; then run the "bar" function with parameters 5 and 5. Proxy 210 can then transmit Transformed Asset 242 to Requestor Device 250.

Figure 3:
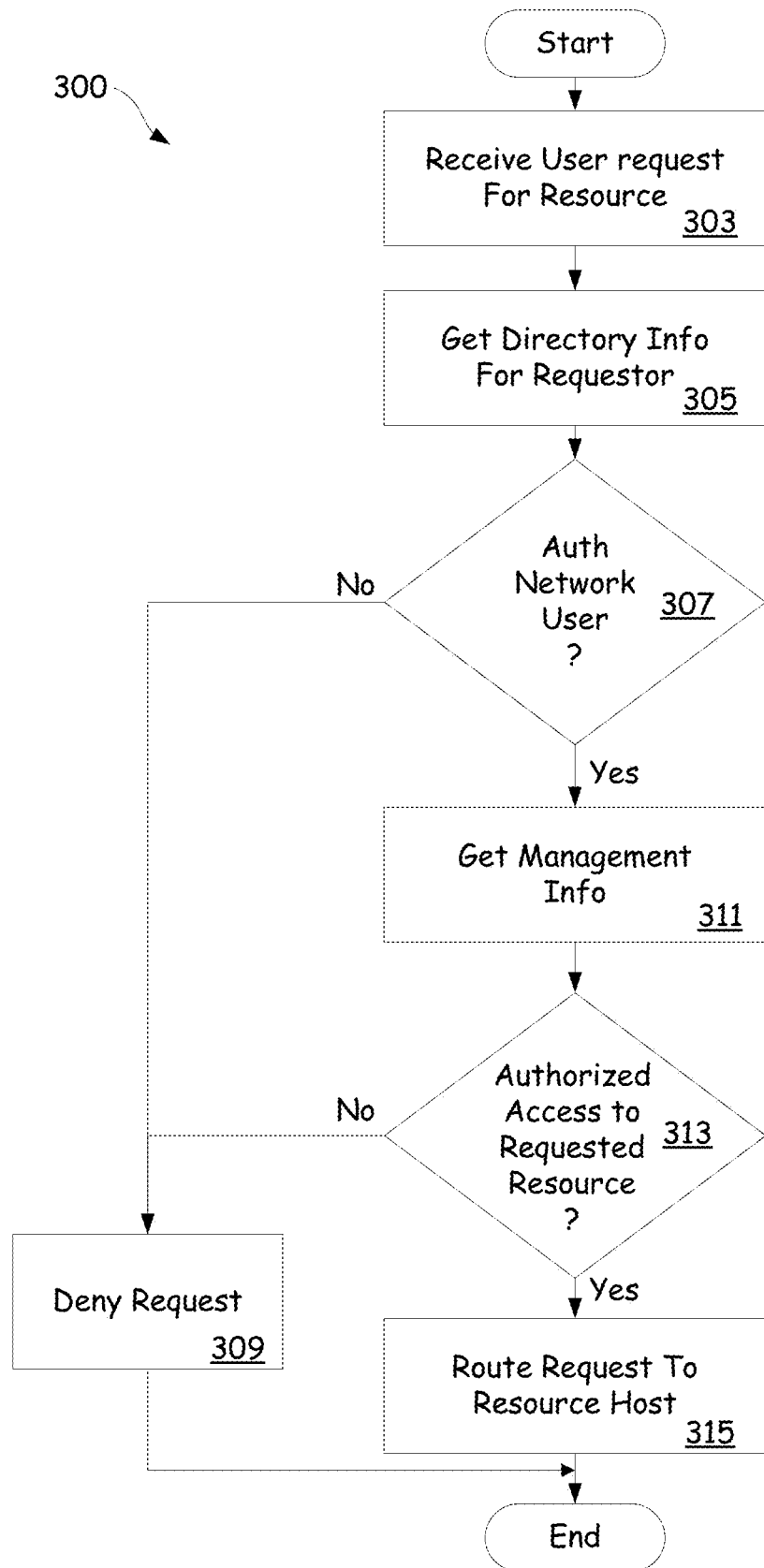
FIG. 3 is a flow chart illustrating a method of handling access requests, in accordance with various embodiments of the present disclosure.

Referring next to FIG. 3, a method 300 will be discussed in accordance with various embodiments of the present disclosure. As illustrated by block 303, a user request for access to a resource is received, for example at a proxy. As illustrated by block 305, directory information for the requestor is obtained or otherwise accessed from a directory service. As illustrated by block 307, a check is made to determine whether the user sending the request is an authorized network user who is allowed to communicate with the proxy or other device fielding the user request. If the user is not an authorized network user, the request is denied, as illustrated at block 309. If the determination at block 307 indicates that the user is an authorized network user, the proxy or other device handling the user request obtains management information, as illustrated by block 311.

As illustrated by block 313, a check is made to determine whether the management information indicates that the user requesting the resource is authorized to access the requested resource. Authorization can be determined at a per-resource level in some embodiments, so for example, a requesting user can have access to product ID 10, but not product ID 11. Access can be further granulized to account for differing versions of a particular asset. If the check at block 313 indicates that access is authorized, the request can be routed to the resource host, as illustrated at block 315. Routing the request, as illustrated by block 315, can include obtaining routing information from a relay database. The routing information can include specific routes to a host, host resolution, security information indicating security requirements for particular addresses, or the like.

In some embodiments, the determination made at block 313 can include determinations at both an application level and a resource level. For example, the management information may indicate that a requesting user is assigned a role that allows the user to access a particular hosted application that can be used to modify media files of a given type. For purposes of this example, assume further that the user has been assigned a role that permits modification of some, but not all media files. The check made at block 313 can check to see if the request requires use of the hosted application, and further check to see if the request requires modification of a modification-prohibited asset. If both the application-level and resource-level (or asset-level) check are favorable, the request can be routed to the resource host, as illustrated by block 315. In this example, if either the application-level or the resource-level determinations are unfavorable, the request is denied, as illustrated by block 309.

Figure 4:
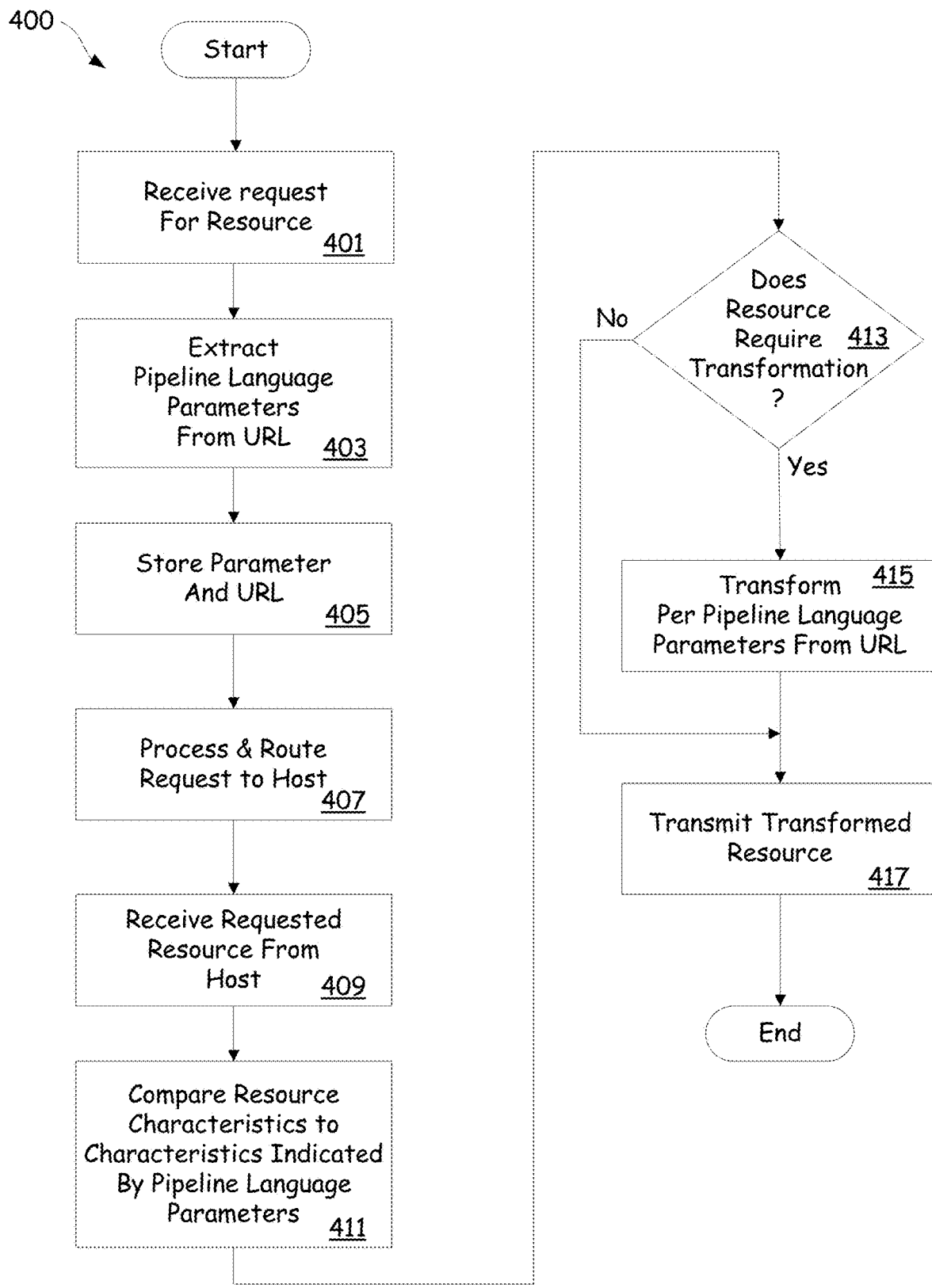
FIG. 4 is a flow chart illustrating a method of transforming resources for delivery to a requestor, in accordance with various embodiments of the present disclosure.

Referring next to FIG. 4 a method 400 will be discussed in accordance with various embodiments of the present disclosure. As illustrated at block 401, a request for authorization to use a resource or asset is received, for example at a proxy device. As illustrated by block 403, pipeline language parameters can be extracted from a URL associated with the request for authorization. These pipeline language parameters can be included in the URL used to transmit the request to the proxy, or can be included in a URL that is part of the transmitted request. In at least one embodiment, the pipeline language parameters can be executed in order to transform a requested asset into a desired form.

As illustrated at block 405, the extracted parameters can be stored for later use in transforming the requested asset. In some embodiments, all or a portion of the URL itself can be stored, and extraction of the pipeline language parameters can be performed at the time the requested asset is received from the host providing the asset.

As illustrated by block 407, the request is processed and routed to the host of the requested asset, as discussed with reference to FIG. 3. The host processes the request, and returns the requested asset to the proxy, as illustrated by block 409. In at least one embodiment, the requested resource or asset is delivered to the proxy in a standardized format, having particular characteristics, selected based on asset type, or in a file specific format and resolution.

The characteristics of the requested asset can be compared to the characteristics indicated by the pipeline language parameters, as illustrated by block 411. A check can then be performed at block 413, based on the results of the comparison, to determine if the requested resource requires transformation. In some cases, no pipeline language parameters may be specified, in which case the result of the determination at block 413 could indicate that no transformation was required. Alternatively, the results of the comparison at block 411 may indicate that the characteristics of the requested resource do not match the characteristics specified by the pipeline language parameters, causing the determination at block 413 to indicate that transformation of the requested resource is required.

For example, the pipeline language parameters extracted from the URL at block 403 might specify that a requested image file should fit within a particular number of pixels. The comparison at block 411 and the check at block 413 could indicate that the requested image already fits within the number of pixels specified by the pipeline language parameters, and that no transformation is necessary. If, however, the comparison at block 411 indicates that the requested image file cannot be fit within the number of pixels indicated by the pipeline language parameters, the check at block 413 would indicate that transformation was required.

As illustrated by block 415, if it is determined at block 413 that transformation is required, the requested asset can be transformed in accordance with the pipeline language parameters included in the URL. Note that in some embodiments, pipeline language instructions are executed to transform the requested asset or resource using the pipeline language parameters included in the URL, regardless of whether the requested asset needs to be transformed or not.

If no transformation is required, as indicated by the determination at block 413, the untransformed resource can be transmitted to the requestor at block 417. Similarly, the transformed resource can be transmitted to the requestor. In various embodiments, transmission of the transformed resource occurs after transformation of part, or all of the requested resource has been completed.

Figure 5:
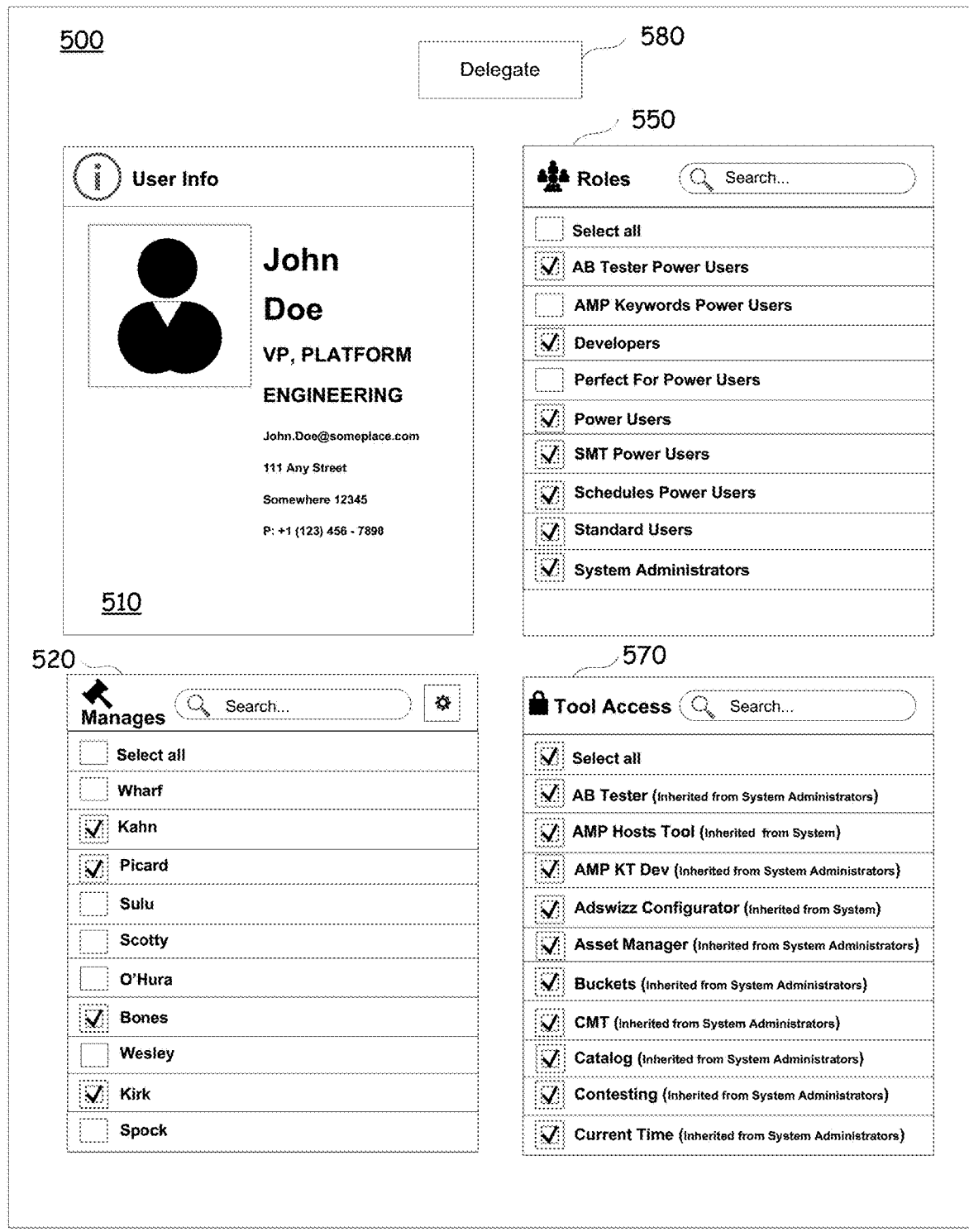
FIG. 5 is a representation of a graphical user interface presenting management information associated with a first user, in accordance with various embodiments of the present disclosure.

Referring next to FIGS. 5-7, decentralized delegation of access authority will be discussed according to various embodiments of the present disclosure. Beginning with FIG. 5, a graphical user interface (GUI) 500 presenting management information associated with a first user is discussed in accordance with various embodiments of the present disclosure. GUI 500 includes User Info Area 510, Manages Area 520, Roles Area 550, Tool Access Area 570, and Delegation Object 580. Various embodiments of the present disclosure can be implemented using any of various GUIs displaying various categories and sub-categories of management information that can be used by a proxy, in conjunction with directory information and routing information, to conditionally route resource requests to servers or other devices hosting shared resources and assets.

Management information displayed in User Info Area 510 can include information about a particular authorized network user, as indicated by directory information obtained from global or local directory services. This information can include standard contact information, including a name, a picture, a job title, a job area, an email address, a work address, one or more phone numbers, and other similar information.

Manages Area 520 can be used to display a portion of the subordinate user information identifying subordinate users, i.e. users that the currently displayed user supervises or otherwise manages. Generally, although not always, these users are also authorized network users as determined by directory information obtained from a directory information server. Although illustrated as a simple list, Manages Area 520 can be displayed in some embodiments as an organizational chart, showing not only subordinate users, but also supervising users. In the illustrated embodiment, Manages Area can display a list of all, or some subset of all, users that could potentially be assigned as subordinates of the currently displayed user, with actually assigned subordinates being indicated by checkmarks next to a user's name.

Roles Area 550 can be used to display a listing of all possible roles to which the currently displayed user is assigned. As illustrated, checkmarks are used to indicate roles to which the currently displayed user is actually assigned. Tool Access Area 570 can be used to display a list of all potential tools to which the currently displayed user has authority to access. Again, the illustrated embodiment uses checkmarks to indicate actually assigned tool access. Other techniques of highlighting or displaying information can be used consistent with various embodiments of the present disclosure.

Delegation Object 580 can be used to configure GUI 500 to receive user input associated with assigning a listed subordinate a role or access to a tool. In some embodiments, Delegation Object 580 can be displayed on GUI 500 when the currently displayed user has at least one subordinate. Selecting Delegation Object 580 can, in some embodiments, allow a user displaying his own management information to select one or more of his assigned subordinates for delegation or assignment of one or more roles or tool access. It will be appreciated that various well-known display and input mechanisms can be used in place of, or in addition to, Delegation Object 580 without departing from the spirit and scope of the present disclosure.

GUI 500, as illustrated, displays some, but not all, management information that can be used by a proxy to conditionally route requests to a resource or asset host. The significance and use of the different types of information displayed in GUI 500 will now be discussed in more detail, according to various embodiments.

In general, each known user is assigned zero or more roles; is seeded in the system with zero or more subordinate users; and is granted access to zero or more tools. Assume for purposes of this discussion that the currently displayed user, John Doe, has been seeded with the illustrated subordinates, roles, and tool access. Roles can be used to provide particular multiple different users with similar access to particular assets or groups of assets. For example, the role of Developer, can be assigned to users who require access to multiple different versions of programs, websites, media items, or other assets in various stages of development. For example, a developer may require access to program code in each of the following environments: unit test, development, product test, regression, and production. By contrast a Standard User might have no need at all for access to program code, but could require the ability to insert or remove standardized content into or from a website. Tool Access can refer to applications or components that various users may need to build websites, insert advertisements, create or modify contests, manage hosted assets, or the like. In general, the roles can be used to refer to what a user does, and the tool access can refer to the tools needed to perform certain actions. In various embodiments, access to a particular file can depend on both assigned roles and tool access.

Referring next to FIG. 6, a graphical user interface (GUI) 600 displaying management information associated with a second user, who is a subordinate of the first user, John Doe, associated with the information displayed in FIG. 5, is discussed in accordance with various embodiments of the present disclosure. GUI 600 includes User Info Area 610, Manages Area 620, Roles Area 650, and Tool Access Area 670, each of which is similar to corresponding portions of GUI 500, which have been previously described. Assume for purposes of the following examples that James Kirk was initially seeded into the system with zero roles, zero subordinate users; and zero authorized tools.

In at least one embodiment, a supervisor is able to confer or grant authority to one or more of his subordinate users to the extent the supervisor himself has been granted authority. For example, as shown in FIG. 5, John Doe has been assigned roles as follows: AB Tester Power Users, Developers, Power Users, SMT Power Users, Schedules Power Users, Standard Users, and System Administrators. Thus, John Doe can confer any of these roles to James Kirk, because James Kirk is a subordinate of John Doe.

In FIG. 6, it can be seen that John Doe has conferred some, but not all, of his own roles to James Kirk, his subordinate: AB Tester Power Users, Developers, Power Users, and SMT Power Users. Similarly, John Doe has granted James Kirk access to the following tools: AB Tester, AMP Hosts Tool, AMP KT Dev, Ads Wizz Configurator, Buckets, and Catalog.

Conferring, or granting, access to a Role or Tool Access can be a permanent until deleted in some embodiments, and can remain active even if the supervisor's roles or tool access changes. Thus, if John Doe is removed from the AB Power User role, James Kirk can keep that role, even though John Doe no longer has the authority to grant that access. In other embodiments, however, access to tools or roles by a subordinate lasts only as long as the supervisor that granted access maintains access himself. Thus, in some embodiments if John Doe's access to the Buckets tool is removed, James Kirk also loses access to the Bucket tool, and access to any resources that require use of the Bucket tool.

It should be appreciated that, in some embodiments, no elevated access is required to grant roles or tool access. That is to say, it is not necessary in some implementations to have administrator or other elevated rights to assign a subordinate roles or tool access. This "what you have you can grant" paradigm can help avoid the necessity of having to wait for a limited group of users having "super-access" rights before a subordinate can be provided with the necessary access to perform his job. This paradigm can be valuable, in loose hierarchical situations, or in situations where broadly scattered and remotely located entities each desire the ability to grant access to their own assets without seeking approval from a centralized authority.

Referring next to FIG. 7, a graphical user interface (GUI) 700 displaying management information associated with a third user, who is a subordinate of the second user, James Kirk, of FIG. 6, in accordance with various embodiments of the present disclosure. GUI 700 includes User Info Area 710, Manages Area 720, Roles Area 750, and Tool Access Area 770, each of which is similar to corresponding portions of GUI 500, which have been previously described. As illustrated by FIG. 7, Wesley Crusher, who is a subordinate of James Kirk (FIG. 6), has been granted the roles of SMT Power Users and Standard Users, and access to the AB Tester tool, by James Kirk. Note that in some embodiments, because Wesley Crusher is not assigned any subordinates, and he therefore cannot delegate roles or tool access to any other user.

In some embodiments, access to particular assets, can also be granted to particular users in addition to roles and tool access, and assigned by those users to their subordinates. A proxy can be used to control a supervisor's delegation, or assignment of roles, tools, or other assets. For example, GUIs 500, 600, and 700 can each be configured to accept user input by adding an "assign" or "delegate" button, dropdown menu, sub-screen, pop-up window, or the like. In response to a user attempting to assign rights to another user, an assignment request message can be sent to the proxy, requesting the proxy to send the management information changes to a relay or other device used to store management information. The proxy can check the subordinate information included in the management information to determine if the target of the delegation or assignment of rights is assigned as a subordinate of the requesting user. If so, the proxy can store the changed management information. If the user receiving the assignment is not an assigned subordinate of the requesting user, the request can be denied.

Referring next to FIG. 8, an information flow 800 between a Client Device 810, a Proxy 820, and a Resource Host 830 will be discussed in accordance with various embodiments of the present disclosure. In various embodiments some or all of the resources or assets are accessed via service components such as software containers or virtualized user spaces, such as those implemented by Docker®. In some such embodiments, Proxy 820 knows the state (e.g. running, available, offline, busy, etc.) of each instance of each container and container type, along with an alias to the primary instance of each container, which can be used for request routing. Thus, Proxy 820 can verify that resource requests comply with various security policies, verify the container and/or component to which the resource request is directed, locate the primary instance of that container and/or component, and dispatch the resource request to the appropriate instance of the appropriate component.

Information flow 800 illustrates source and version control techniques that can be used in conjunction with various shared assets and resources. For example a Client Device 810 can be used to send a Load Resource Request 803 to Proxy 820, which processes and forwards the request to verify that a requestor is authorized to perform the requested action in conjunction with the resource, for example, read a resource, modify a resource, delete a resource, or add a resource. For purposes of this discussion it will be assumed that a requestor has the required level of resource access via Client Device 810.

As illustrated in information flow 800, Client Device 810 transmits Load Resource Request 803 to Proxy 820, which in turn routes Load Resource Request 803 to Resource Host 830. In this example, the resource requested in Load Resource Request 803 is Asset 833, which can be identified in the system using a reference identifier derived using a hash function, for example "a3021f" in the case of Asset 833. Assets and resources can also be tagged, for example to maintain version control. In the illustrated embodiment, Asset 833 is associated with Tag 840, which identifies Asset 833 as a HEAD version, referring to the fact that Asset "a3021f" 833 is the newest, or most recently updated version of the requested resource. Other possible tag types include "LIVE," "PENDING_APPROVAL," "BETA," or similar tags indicating a particular state of the asset. Tags can be used to provide platform-wide auditing of resources.

In some embodiments, a developer or other user may choose not to keep a versioning history of various resources. In some such embodiments, a "WORKING COPY" tag can be associated with a resource, indicating to the Resource Host 830 or other users that the resource is not a "versioned resource." When a user submits a change to a resource associated with a WORKING COPY tag, the Resource Host 830 can simply overwrite the previous version, without saving and tracking a new version.

Resource Host 830 can respond to Load Resource Request 803 by providing access to Asset 833 via a Payload Response 805 to Proxy 820, which can forward the Payload Response 805 to Client Device 810 with or without first transforming the requested resource. Client device 810 can modify the requested resource, and transmit a Modify and Save Request 807 to Proxy 820. The Modify and Save Request 807 can be processed by Proxy 820, and routed to Resource Host 830. A new identifier for the modified version of the resource can be calculate, for example using a Hash function to arrive at "f32gde", and Resource Host 830 can store the modified resource as Asset 835. Note that because Asset 835 is now the most recent version, Asset 835 is associated with Tag 842, indicating that Asset 835 is now the HEAD. Although not illustrated, when Asset 835, which in this example is a modified version of the requested asset, is tagged as a HEAD version, TAG 840, which is associated with the unmodified version of the requested asset can be modified to indicate, for example, "VERSION −1", to indicate that Asset 835 is the version of the requested resource immediately preceding the current HEAD version of the requested asset.

Various embodiments also allow a user, via client device 810, to manually add a reference tag to an asset. For example, Add Ref Instruction 809 can be sent from client device 810 to Resource Host 830. In response to Add Ref Instruction 809, Resource Host 830 can associate Ref Tag 844 with Asset 837. Ref Tag 844 can be a standard version identifier, or custom reference identifier, for example a tag identifying Asset 837 as a "working copy."

It will be appreciated by those of ordinary skill in the art that although the present disclosure refers to radio stations in describing various embodiments, other embodiments, not limited to radio stations, can also be implemented consistent with the teachings set forth herein.

As used herein, the terms "resource" and "asset" are used interchangeably, and unless otherwise explicitly indicated or required by context, refer to files, programs, applications, data, and other items that can be stored in a tangible computer readable storage medium.

As may be used herein, the terms "substantially" and "approximately" provide an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The term "module" is used in the description of one or more of the embodiments. A "module", "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments of an invention have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The one or more embodiments are used herein to illustrate one or more aspects, one or more features, one or more concepts, and/or one or more examples of the invention. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

While particular combinations of various functions and features of the one or more embodiments have been expressly described herein, other combinations of these features and functions are likewise possible. The present disclosure of an invention is not limited by the particular examples disclosed herein and expressly incorporates these other combinations.

What is claimed is:

1. A method comprising:
receiving from a requestor via a client device, at a proxy device, a resource request associated with a hosted resource, wherein the hosted resource is associated with a version-control tag;
determining, by the proxy device, based on the version-control tag, information indicating a current state of the hosted resource;
obtaining, by the proxy device, user management information associated with the requestor; and
conditionally dispatching a processed resource request from the proxy device to a resource host based, at least in part, on the current state of the hosted resource and the user management information.

2. The method of claim 1, further comprising:
dispatching the processed resource request from the proxy device to a resource host in response to determining that the requestor is permitted access to resources having a state matching the current state of the hosted resource.

3. The method of claim 2, further comprising:
wherein multiple instances of the hosted resource exist, including a primary instance of the hosted resource;
determining by the proxy device, an alias to the primary instance;
generating the processed resource request to include information indicating the primary instance; and
dispatching the processed resource request from the proxy device to the resource host.

4. The method of claim 1, wherein:
the version-control tag includes information indicating that a single instance of the hosted resource exists.

5. The method of claim 1, further comprising:
discarding the resource request in response to determining that the requestor lacks permissions to access resources having a state matching the current state of the hosted resource.

6. The method of claim 1, further comprising:
transmitting an error notification from the proxy device to the client device in response to determining that the requestor lacks permissions to access resources having a state matching the current state of the hosted resource.

7. The method of claim 1, wherein:
the information indicating a current state of the hosted resource includes information specifying one or more states selected from the group consisting essentially of "Available," "Running," "Offline," "Busy," and "Working-Copy".

8. A proxy device comprising:
a communications interface configured to receive from a requestor via a client device, a resource request associated with a hosted resource, wherein the hosted resource is associated with a version-control tag;
a processor configured to implement a request handling module, the request handling module configured to:
determine, based on the version-control tag, information indicating a current state of the hosted resource;
obtain user management information associated with the requestor; and
conditionally dispatch a processed resource request from the proxy device to a resource host based, at least in part, on the current state of the hosted resource and the user management information.

9. The proxy device of claim 8, wherein the request handling module is further configured to:
dispatch the processed resource request from the proxy device to a resource host in response to determining that the requestor is permitted access to resources having a state matching the current state of the hosted resource.

10. The proxy device of claim 9, wherein:
multiple instances of the hosted resource exist, including a primary instance of the hosted resource;
the request handling module is further configured to:
obtain an alias to the primary instance;
generate the processed resource request to include information indicating the primary instance; and
dispatch the processed resource request from the proxy device to the resource host.

11. The proxy device of claim 8, wherein:
the version-control tag includes information indicating that a single instance of the hosted resource exists.

12. The proxy device of claim 8, wherein the request handling module is further configured to:
discard the resource request in response to determining that the requestor lacks permissions to access resources having a state matching the current state of the hosted resource.

13. The proxy device of claim 8, wherein the request handling module is further configured to:

transmit an error notification from the proxy device to the client device in response to determining that the requestor lacks permissions to access resources having a state matching the current state of the hosted resource.

14. The proxy device of claim 8, wherein:
the information indicating a current state of the hosted resource includes information specifying one or more states selected from the group consisting essentially of "Live," "Pending_Approval," "Beta," and "Head".

15. A non-transitory computer readable medium tangibly embodying a program of instructions to be executed by a processor, the program of instructions comprising:
    at least one instruction to receive from a requestor via a client device, at a proxy device, a resource request associated with a hosted resource, wherein the hosted resource is associated with a version-control tag;
    at least one instruction to determine, by the proxy device, based on the version-control tag, information indicating a current state of the hosted resource;
    at least one instruction to obtain, by the proxy device, user management information associated with the requestor; and
    at least one instruction to conditionally dispatch a processed resource request from the proxy device to a resource host based, at least in part, on the current state of the hosted resource and the user management information.

16. The non-transitory computer readable medium of claim 15, wherein the program of instructions further comprises:
    at least one instruction to dispatch the processed resource request from the proxy device to a resource host in response to determining that the requestor is permitted access to resources having a state matching the current state of the hosted resource.

17. The non-transitory computer readable medium of claim 16, wherein:
    multiple instances of the hosted resource exist, including a primary instance of the hosted resource;
    and the program of instructions further comprises:
        at least one instruction to determine by the proxy device, an alias to the primary instance;
        at least one instruction to generate the processed resource request to include information indicating the primary instance; and
        at least one instruction to dispatch the processed resource request from the proxy device to the resource host.

18. The non-transitory computer readable medium of claim 15, wherein:
    the version-control tag includes information indicating that a single instance of the hosted resource exists.

19. The non-transitory computer readable medium of claim 15, wherein the program of instructions further comprises:
    at least one instruction to discard the resource request in response to determining that the requestor lacks permissions to access resources having a state matching the current state of the hosted resource.

20. The non-transitory computer readable medium of claim 15, wherein the program of instructions further comprises:
    at least one instruction to transmit an error notification from the proxy device to the client device in response to determining that the requestor lacks permissions to access resources having a state matching the current state of the hosted resource.

* * * * *